(12) United States Patent
Tobias

(10) Patent No.: US 7,197,657 B1
(45) Date of Patent: Mar. 27, 2007

(54) BMC-HOSTED REAL-TIME CLOCK AND NON-VOLATILE RAM REPLACEMENT

(75) Inventor: David Francis Tobias, Pflugerville, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 589 days.

(21) Appl. No.: 10/406,130

(22) Filed: Apr. 3, 2003

(51) Int. Cl.
*G06F 1/12* (2006.01)
*G06F 13/42* (2006.01)

(52) U.S. Cl. ...................... 713/400; 713/401

(58) Field of Classification Search ............. None
See application file for complete search history.

(56) References Cited

U.S. PATENT DOCUMENTS

| | | | |
|---|---|---|---|
| 5,422,862 A * | 6/1995 | Wisor | 368/10 |
| 5,542,077 A * | 7/1996 | Johnson et al. | 713/300 |
| 5,727,221 A * | 3/1998 | Walsh et al. | 713/310 |
| 5,802,305 A * | 9/1998 | McKaughan et al. | 709/227 |
| 5,826,015 A | 10/1998 | Schmidt | |
| 6,493,824 B1 * | 12/2002 | Novoa et al. | 713/162 |
| 6,571,111 B1 * | 5/2003 | Mayo et al. | 455/574 |
| 6,950,952 B2 * | 9/2005 | Felsman | 713/310 |
| 7,024,695 B1 * | 4/2006 | Kumar et al. | 726/26 |
| 2003/0041182 A1 | 2/2003 | Martwick | |

OTHER PUBLICATIONS

Messmer, Hans-Peter, "The Indispensible PC Hardware Book", Fourth Edition, Great Britain 2002, pp. 24-26; 573-574; and 602-613.

Chakravarthi, Srigurunath et al., Abstract of "A Fine-Grain Clock Synchronization Mechanism for QoS Based Communication on Myrinet", Mississippi State University, pp. 1-16.

Intel Corporation, "IPMI v1.5 Overview", 2001, pp. 1-4.

Intel Hewlett-Packard NEC Dell, "IPMI—Intelligent Platform Management Interface Specification v1.5", Feb. 20, 2002, Revision 1.1, pp. ii-31.

Q Logic Corporation, "Remote Management Controller—Data Sheet", 36000-580-00 C, pp. 1-5.

Agilent Technologies, "Agilent Technologies eRMC Base 1.0 Technical Specifications", Germany, 2001, pp. 1-4.

* cited by examiner

*Primary Examiner*—Rehana Perveen
*Assistant Examiner*—Stefan Stoynov
(74) *Attorney, Agent, or Firm*—Zagorin O'Brien Graham LLP

(57) ABSTRACT

A baseboard management controller (BMC) hosts a real-time clock and non-volatile RAM replacement that does not require a battery power supply. The BMC includes an I/O mapped interface responsive to I/O accesses to an address range associated with storage locations of a real-time clock circuit and storage locations holding configuration information. The BMC receives power when a processor coupled to the BMC is not powered. The I/O address range may include 70*h* and 71*h*. A network interface may communicate information between a network external to the BMC and the real-time clock and/or the storage locations holding the configuration information. The network external to the BMC may communicate clock synchronization and/or configuration information to the BMC.

23 Claims, 4 Drawing Sheets

BMC-HOSTED REAL-TIME CLOCK AND NON-VOLATILE RAM REPLACEMENT

CROSS-REFERENCE TO RELATED APPLICATION(S)

BACKGROUND

1. Field of the Invention

This invention relates to computing systems and more particularly to the real-time clock and configuration parameters utilized by computers.

2. Description of the Related Art

In prior art systems, the real-time clock was a battery-powered circuit providing date and time information independently from power supplied to the central processing unit (CPU) and other system components. When the computer is turned off, the real-time clock continues to update the time and date. In prior art systems, the real-time clock stores the time and date in a circuit on the motherboard of the computer called the CMOS RAM. The CMOS RAM also stores information relating to system configuration. The CMOS RAM is supplied with battery power to maintain configuration data even when the computer is powered off. During the boot process, the Basic Input/Output System (BIOS) utilizes information from the CMOS RAM, reads the time and date from the CMOS RAM, and sets an internal system clock used by software based on the time/date information.

Prior art implementations include the real-time clock and the CMOS RAM in a single device. Referring to FIG. 1, a prior art computer system 100 includes a CPU 102, connected to an I/O interface 104 that connects to integrated circuit 106. Device 106 includes a real-time clock 108, and CMOS RAM 110. CMOS RAM 110 includes storage locations 112 and 114 for date, time, and configuration data storage. A typical CMOS RAM implementation includes at least 64 bytes and may operate for several years with a single battery.

The bytes of the CMOS RAM can be addressed individually. Typically, the first 14 bytes of the CMOS RAM are reserved for time and date information and the control and status registers for the real-time clock. The remainder of the CMOS RAM stores hardware-specific information including processor clock speed, size of the BIOS ROM, data bus size, etc. The typical CMOS RAM includes four status registers that are used for monitoring and programming the operating mode of the real-time clock and the CMOS RAM chip. The real-time clock may be accelerated, slowed down, initialized, or adjusted for daylight savings time. In addition, various interrupts can be enabled. The CMOS RAM also stores information regarding the shutdown status of the computer and the indicators for memory and power failures. CMOS RAM 110 has typically been accessed in two ways: limited access via a BIOS interrupt 1Ah, and complete access via the address and data register accessible via input/output instructions at ports 70h and 71h.

BIOS interrupt 1Ah provides access to date and time features of the real-time clock. Although CMOS RAM 110 includes additional data storage locations that are not part of the function of these date and time features, the additional data storage locations are not accessible via the BIOS interrupt handler for interrupt 1Ah. Instead, data stored in these additional data storage locations, e.g., configuration data, are accessed via the ports 70h and 71h. Port 70h accesses the address register of the CMOS RAM 110 and port 71h accesses the data register of the CMOS RAM 110. CPU 102 may access CMOS RAM 110 via the I/O interface 104, by accessing I/O ports numbered 70h and 71h. CPU 102 supplies an address to port 70h and retrieves the corresponding byte of data from port 71h.

Device 106 is powered by battery 116. Although device 106 requires little power as compared to other memory circuits, it may need replacement after several years. Depending on the implementation, battery replacement may require merely opening the device package and replacing the battery, replacing the entire chip, or even replacing the motherboard. Replacement may be expensive and data may be lost in the process. Therefore, it would be desirable to replace device 106 with an implementation that does not require a battery power supply.

SUMMARY

Accordingly, the invention provides a BMC-hosted real-time clock and non-volatile RAM replacement that does not require a battery power supply.

In one embodiment of the invention, the BMC includes an I/O mapped interface responsive to I/O accesses to an address range associated with storage locations of a real-time clock circuit and storage locations holding configuration information. The BMC receives power when a processor coupled to the BMC is not powered. In one embodiment of the invention, the I/O address range includes 70h and 71h.

In one embodiment of the invention, a network interface communicates information between a network external to the BMC and the real-time clock and/or the storage locations holding the configuration information. The network external to the BMC communicates clock synchronization and/or configuration information to the BMC.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Servers are computing systems that give multiple clients access to the same data or resources. A group of networked servers that reside in a single location are known as server farms. Processes are distributed among these servers to improve performance and reliability of processes running on the individual servers. Software tracks the processing demand from individual machines, prioritizing tasks, and scheduling and rescheduling these tasks.

The Intelligent Platform Management Interface (IPMI) architecture specification defines a common interface to the hardware that monitors server physical health characteristics including temperature, voltage, fans, power supplies, and chassis intrusion. For a detailed description of the IPMI architecture, see Intel Corp., Hewlett-Packard Corp., NEC Corp., & Dell Computer Corp., *Intelligent Platform Management Interface Specification* v1.5, (Feb. 20, 2002), which is incorporated herein by reference.

IPMI also includes automatic alerting, automatic system shutdown and restart, remote restart and power control capabilities, and asset tracking. The standard describes an interface for remote management of servers and systems. Managers can determine the health of systems whether the servers are running normally or the servers are in a non-operational state. A characteristic of an IPMI-compliant system is that inventory, monitoring, logging, and recovery control functions are available independent from the main processors, BIOS, and the operating system.

Figure 1:
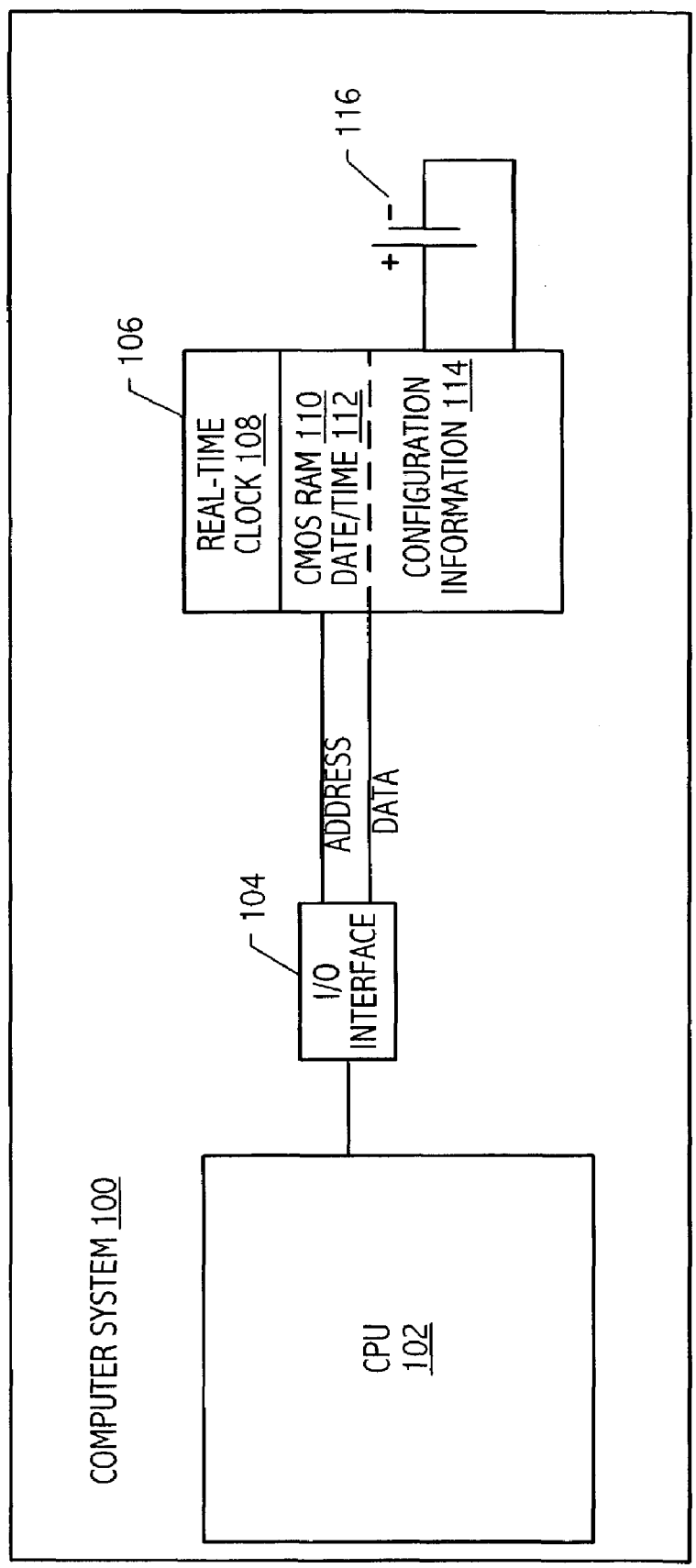
FIG. 1 is a prior art implementation of a computer system with a battery-powered device including a real-time clock and CMOS RAM.
Figure 2:
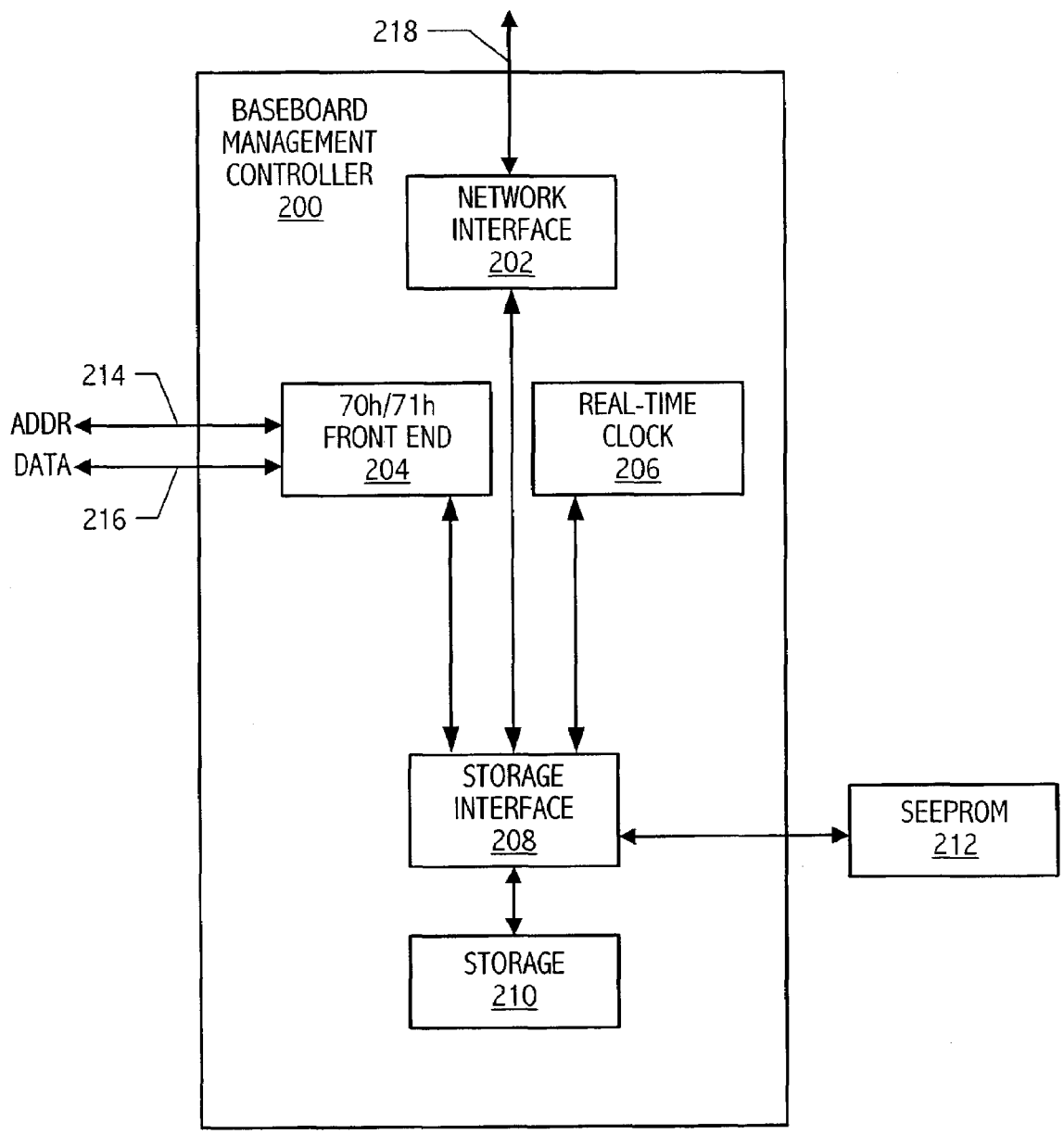
FIG. 2 illustrates an exemplary baseboard management controller circuit configured consistent with the present invention.

One of the main elements of an IPMI-compliant system is the baseboard management controller (BMC). FIG. 2 illustrates BMC 200 configured according to an embodiment consistent with the present invention. The BMC is a central management controller that monitors system parameters, logs events, provides recovery control, manages the interface between system management software and platform management hardware, and provides a gateway between system management software and the Intelligent Chassis Management Bus (ICMB) and the Intelligent Platform Management Bus (IPMB) in an IPMI-compliant system. The BMC operates autonomously from the main processors, BIOS, and operating system, and functions even when the system is in a powered-down state. This may be accomplished by providing a power plane that allows power to be supplied independently of power supplied to other system components, including the CPU(s). Note that any sensors that are to be monitored by the BMC while system power is down (e.g., chassis temperature sensors) also supplied by this "always on" power plane. The BMC is a trusted component that is connected to a central monitoring facility by a local area network (LAN) connection. The BMC enables remote monitoring and control of the operational state of the system. The BMC functionality may be implemented with a combination of hardware and firmware.

Because the BMC functions when the system is powered down, the functions of the RTC and the CMOS RAM may be incorporated into the BMC and the battery may be eliminated.

FIG. 2 illustrates an exemplary BMC 200 embodying an embodiment of the present invention. The BMC 200 includes a 70h/71h front end 204, a real-time clock 206, and storage 210, which may be implemented as SRAM. In one embodiment, 70h/71h front end 204 is implemented by firmware running on the BMC 200. The 70h/71h front end 204 emulates the port functionality of an address register 70h and a data register 71h interacting with storage. An example of the behavior emulated by the 70h/71h front end is illustrated by the following assembly code instructions:

;Read contents of location 30h of the CMOS RAM:
mov al, 30h; Set up the CMOS RAM address
out 70h, al; Write the address to 70h
in al, 71h; Read contents of CMOS RAM location 30h into al register
;Write 55h to location 30h of the CMOS RAM:
mov al, 30h; Set up the CMOS RAM address
out 70h, al; Write the address to port 70h
mov al, 55h; Set up data to be written
out 71h, al; Write the data 55h to address CMOS RAM location 30h
;Location 30h of the CMOS RAM now contains data 55h.

The address being accessed is written to port 70h. Data is read or written from port 71h in response to a read or write access, respectively.

In one embodiment, real-time clock 206 is implemented via a background firmware process that increments a counter at a predefined rate. The real-time clock 206 stores the counter value in memory via storage interface 208. Storage interface 208 reads and writes real-time clock data and configuration data to storage 210. In one embodiment, storage interface 208 is a firmware process that copies the configuration information and/or information related to the real-time clock from memory 210 to non-volatile memory 212. That way, in the event of a failure in the power being supplied to the BMC, the information will not be lost. Serial EEPROM 212 is available to BMC 200 for non-volatile storage. Alternative embodiments may include SRAM external to the BMC, non-volatile memory internal to the BMC, or a combination thereof. In one embodiment, non-volatile storage may be provided by a remote computer that communicates with BMC 200 via LAN 218. Thus, the cost of an individual system including BMC 200 may be reduced by relocating nonvolatile storage for storing the contents of the CMOS RAM to a remote computer. In one embodiment, BMC 200 emulates some or all functions of the real-time clock in firmware, thus reducing the system cost by eliminating hardware. In one embodiment, network interface 202 can receive real-time clock synchronization data and/or configuration information from a remote computer. In one embodiment, storage interface 208 receives those data and updates appropriate locations of memory 210 corresponding to the real-time clock. Alternatively, network interface 202 may communicate real-time clock data directly to real-time clock 206. In addition, network interface 202 communicates real-time clock synchronization data and configuration information from the storage interface 208 to facilitate system monitoring by a remote computer.

Figure 3:
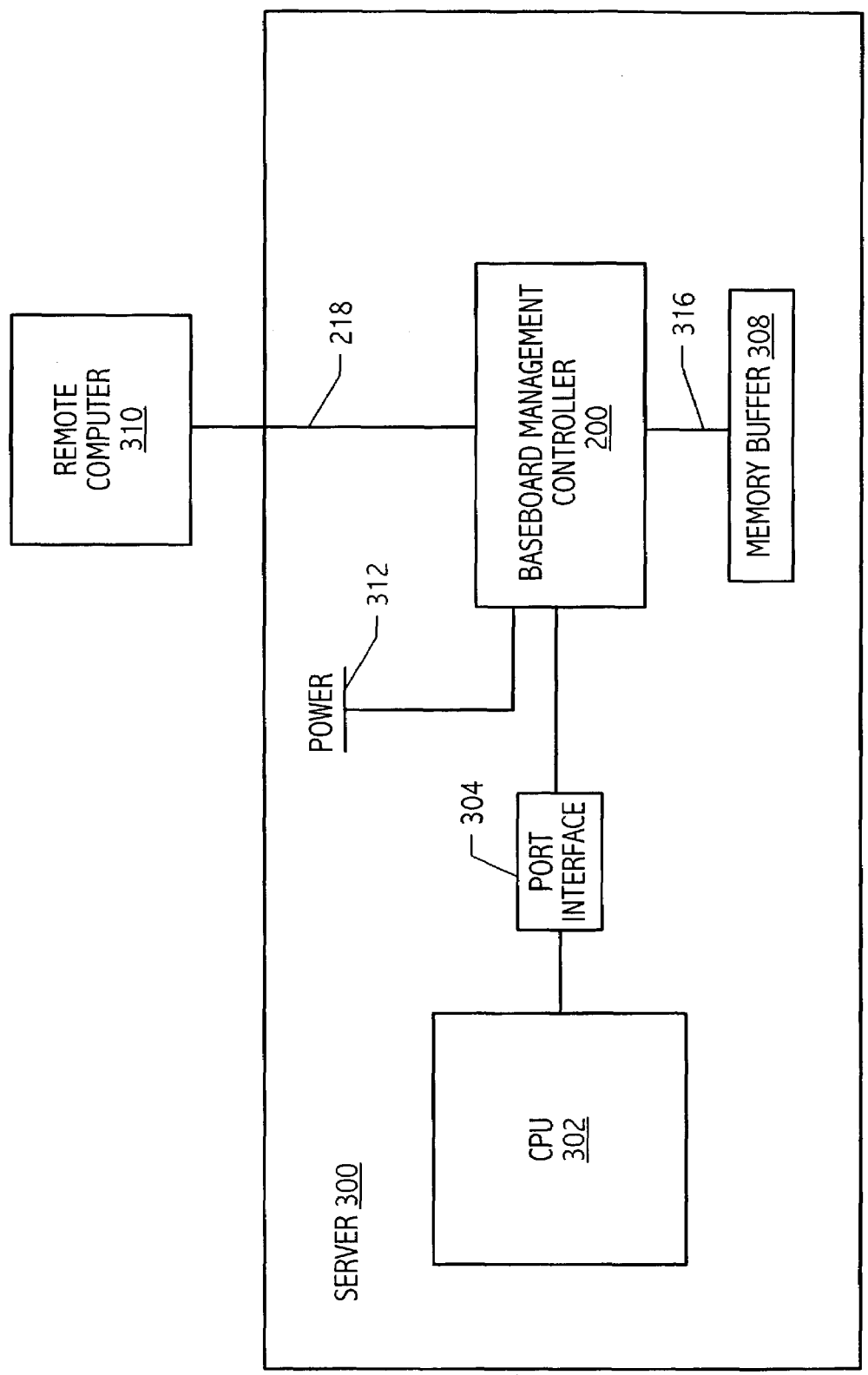
FIG. 3 illustrates an exemplary server computer including a baseboard management controller configured to include the present invention.

FIG. 3 illustrates a server computing system incorporating an embodiment of the present invention. Server 300 is connected to a remote computer 310 by LAN 218. Within server 300, baseboard management controller 200 communicates with CPU 302 via port interface 304. Memory buffer 308 is connected to the baseboard management controller 200 via bus 316. Baseboard management controller 200 receives configuration data or real-time clock synchronization data from remote computer 310. Baseboard management controller 200 receives power from power supply 312 even when CPU 302 is powered off.

In one embodiment, if the server power fails and thus the power supplied to BMC 200 fails, system time may be lost. However, remote computer 310 can detect when the BMC power plane is restored and remote computer 310 programs BMC 200 with the correct time, without CPU 302 detecting the time loss. In addition, individual time drift on server 300 can be eliminated by receiving a time update from remote computer 310.

Figure 4:
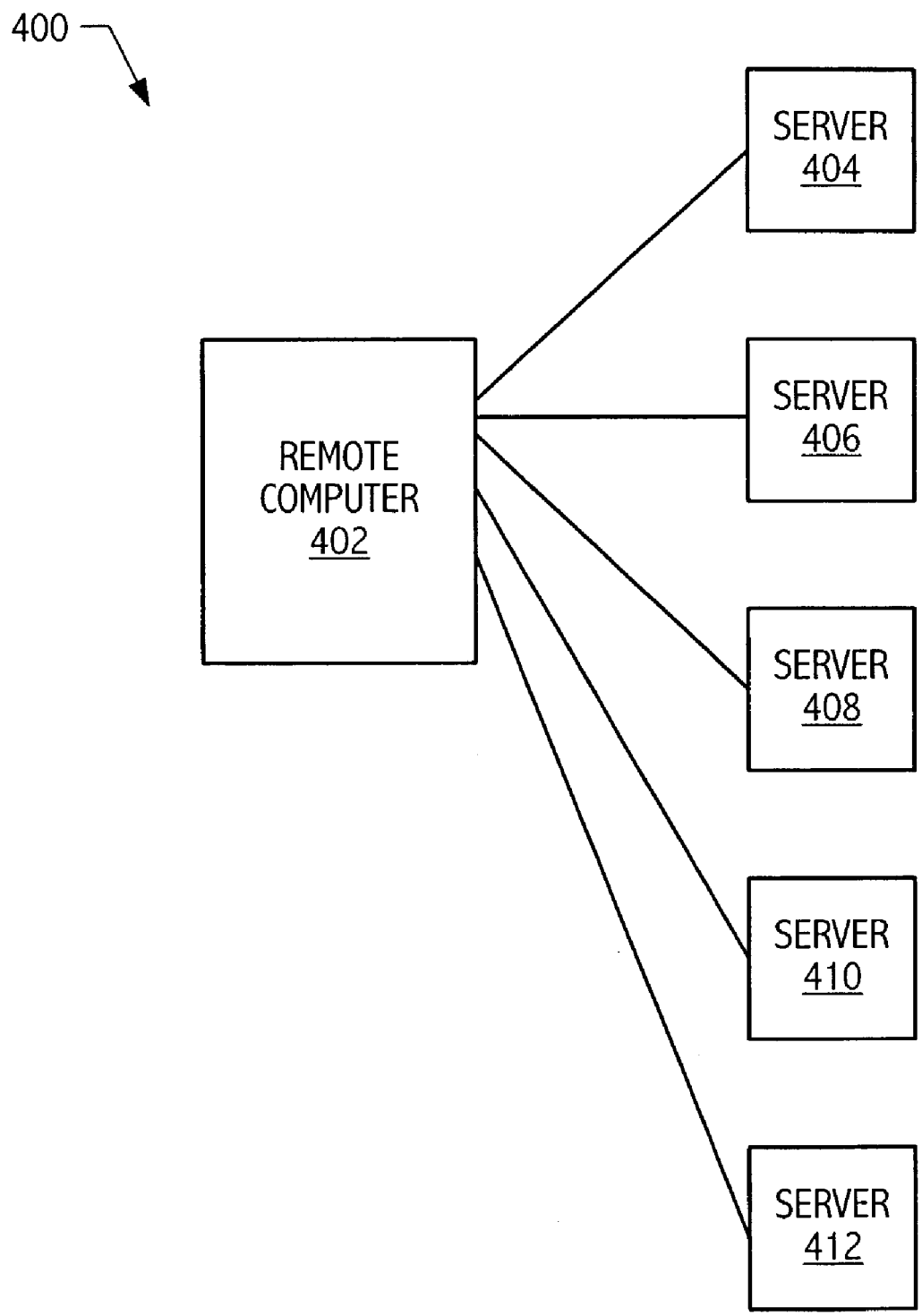
FIG. 4 illustrates a server farm utilizing the present invention.

FIG. 4 illustrates multiple servers 404–412 including the present invention. Servers 404–412 are connected to remote computer 402. Remote computer 402 can monitor the real-time clocks and configuration information on all of the servers on the network. In addition, remote computer 402 can download identical real-time clock synchronization information and/or configuration information to all or a subset of servers 404–412. That allows efficient updates in a multiple server environment.

The description of the invention set forth herein is illustrative, and is not intended to limit the scope of the invention as set forth in the following claims. For example, while the invention has been described in an embodiment in which the 70*h*/71*h* front end, storage interface, and real-time clock are implemented in firmware, one of skill in the art will appreciate that the teachings herein can be utilized with hardware implementations of these blocks. Variations and modifications of the embodiments disclosed herein, may be made based on the description set forth herein, without departing from the scope and spirit of the invention as set forth in the following claims.

What is claimed is:

1. A baseboard management controller integrated circuit comprising:
    an I/O mapped interface responsive to I/O accesses of a processor to an I/O address range associated with first storage locations of a real-time clock circuit and second storage locations holding configuration information; and
    a network interface,
    wherein the baseboard management controller integrated circuit is operable when other components of a system in which the baseboard management controller integrated circuit resides are in a powered-down state,
    wherein at least a portion of the second storage locations resides on the baseboard management controller integrated circuit.

2. The baseboard management controller integrated circuit, as recited in claim 1, wherein the network interface is coupled to communicate information between a network external to the baseboard management controller integrated circuit and at least one of the real-time clock circuit and the storage locations holding configuration information.

3. The baseboard management controller integrated circuit, as recited in claim 2, wherein the information is real-time clock synchronization information.

4. The baseboard management controller integrated circuit, as recited in claim 1, wherein the I/O mapped interface is responsive to I/O accesses of the processor to port 70*h* and port 71*h*.

5. The baseboard management controller integrated circuit, as recited in claim 1, wherein at least a portion of the first storage locations resides on the baseboard management controller integrated circuit.

6. The baseboard management controller integrated circuit, as recited in claim 1, wherein the baseboard management controller integrated circuit is Intelligent Platform Management Interface (IPMI) compliant.

7. The baseboard management controller integrated circuit, as recited in claim 1, wherein the baseboard management controller integrated circuit is configured as a portion of a server within a server farm and is configured to monitor system parameters of the server.

8. The baseboard management controller integrated circuit, as recited in claim 1, wherein the baseboard management controller integrated circuit is coupled to a power plane independent from the processor.

9. A computer system comprising:
    a baseboard management controller circuit coupled to be powered when a processor coupled to the baseboard management controller circuit is not powered;
    a remote computer coupled to the baseboard management controller circuit via a network interface;
    wherein the baseboard management controller circuit includes an I/O mapped interface responsive to I/O accesses of the processor, the I/O accesses being to an I/O address range associated with first storage locations of a real-time clock circuit and second storage locations holding configuration information accessible through the I/O mapped interface; and
    wherein the baseboard management controller circuit includes the network interface,
    wherein at least a portion of the second storage locations reside on the remote computer.

10. The computer system, as recited in claim 9, wherein the remote computer communicates clock synchronization information to the baseboard management controller circuit.

11. The computer system, as recited in claim 9, wherein the remote computer communicates configuration information to the baseboard management controller circuit.

12. The computer system, as recited in claim 9, wherein the I/O mapped interface is a port 70*h* and port 71*h* interface.

13. The computer system, as recited in claim 9, further comprising:
    a memory buffer wherein the memory buffer is nonvolatile memory and is coupled to receive configuration information from the baseboard management controller circuit.

14. The computer system, as recited in claim 13, wherein the nonvolatile memory is a serial EEPROM.

15. A method for accessing a real-time clock and configuration information comprising:
    executing, by a processor, an I/O command to access an I/O port associated with the real-time clock and configuration information, at least a portion of the configuration information being stored in storage locations residing on a baseboard management controller;
    decoding the I/O command on a baseboard management controller; and
    accessing the real-time clock coupled to the baseboard management controller.

16. The method, as recited in claim 15, further comprising:
    accessing, by the processor, the configuration information via the baseboard management controller.

17. The method, as recited in claim 15, further comprising:
    storing the real-time clock and at least a portion of the configuration information in non-volatile memory.

18. The method, as recited in claim 15, further comprising:
    supplying synchronization information to a plurality of computer systems, each having real-time clock circuits;
    synchronizing the plurality of real-time clock circuits using the synchronization information.

19. The method, as recited in claim 18, wherein the synchronization information is received by the baseboard management controller.

20. The method, as recited in claim 19 wherein the baseboard management controller is Intelligent Platform Management Interface (IPMI) compliant.

21. An apparatus comprising:
    a baseboard management controller means for providing a port interface responsive to I/O access requests from a processor, the I/O access requests being for accessing real-time clock information and processor configuration information; and
    means for providing a real-time clock;
    wherein the baseboard management controller means comprises means for storing the processor configuration information; and
    a network interface.

22. The apparatus, as recited in claim 21, further comprising:

means for synchronizing the means for providing a real-time clock with a remote real-time clock.

23. A baseboard management controller integrated circuit comprising:

an I/O mapped interface responsive to I/O accesses of a processor to an I/O address range associated with first storage locations of a real-time clock circuit and second storage locations holding configuration information; and a network interface, wherein the baseboard management controller integrated circuit is operable when other components of a system in which the baseboard management controller integrated circuit resides are in a powered-down state, wherein the baseboard management controller integrated circuit is configured to communicate with the processor and to communicate with a remote computer via the network interface, the remote computer being configured to receive system parameter information from the baseboard management controller.

* * * * *